INVENTOR
GEIR BJORNSON

*INVENTOR*
GEIR BJORNSON
BY
Young + Dugg
ATTORNEYS

INVENTOR
GEIR BJORNSON
BY
Young + Jugg
ATTORNEYS

United States Patent Office 3,376,211
Patented Apr. 2, 1968

3,376,211
METHOD AND APPARATUS FOR PERFORMING CHEMICAL REACTIONS BY MEANS OF AN ELECTRIC ARC
Geir Bjornson, Bartlesville, Okla., assignor to Phillips Petroleum Company, a corporation of Delaware
Filed Apr. 19, 1965, Ser. No. 449,145
11 Claims. (Cl. 204—311)

ABSTRACT OF THE DISCLOSURE

A plasma arc reactor comprises in combination a cathode, a reaction chamber comprised of an elongated graphite anode insulated by refractory metal oxide of substantial thickness, electromagnetic means for rotating an arc within the reaction chamber, and means for feeding reactant gases to the reaction chamber.

This invention relates to a method of performing chemical reactions in an electric arc. It also relates to an apparatus for performing chemical reactions under the influence of an electric arc at high efficiencies. In one aspect, my invention relates to the performance of chemical reactions in a transferred electric arc wherein the remote anode serves as the reaction chamber. In another aspect, my invention relates to performing chemical reactions under the influence of an electric arc which is rapidly rotated to cut across the feed stream. In another aspect, it relates to a plasma reactor in which the walls are cooled by the reactant. In another aspect, it relates to a method of mixing the reactants with the plasma by introducing the reactants both tangentially and radially. In still another aspect, it relates to a plasma arc reaction chamber which requires no external cooling because of its particular construction. In still another aspect, it relates to a plasma arc reaction chamber which is so constructed as to be resistant to reducing atmospheres interiorly and resistant to oxidizing atmospheres exteriorly.

Plasma generating devices are capable of producing exteremly hot streams of ionized gas. Gases such as hydrogen, nitrogen, argon and the like have been heated to plasmas having temperature of 30,000° F. and higher. Such plasmas have been utilized as heat and light sources and also have been used as environments for initiating and supporting chemical reactions which require the input of thermal energy.

Several problems exist when plasmas are used in chemical conversions. One is to choose materials of construction to be resistant to the extremely high temperatures involved in a reactor, and also to be resistant to chemical reduction or oxidation from air or the plasma gas stream at those high temperatures. In conventional reactors, the walls of the reaction chamber are cooled by an external coolant, leading to low electrical efficiency of the operation. A further problem is that of mixing the reactants with the plasma and bringing these reactants to the reaction temperature quickly and uniformly. A further problem is in controlling the temperature of the electric arc itself.

In a plasma generator, a significant amount of heat energy is lost to the coolant which is necessary to keep the electrodes in the areas adjacent to them from disintegrating due to the extreme heat. For example, it is estimated that about 5 percent of the heat produced in a plasma generator is lost in efforts to keep the cathode cool and about 40 percent of the heat is lost keeping the anode cool. This cooling is generally carried out by flowing water, and the heat energy thus carried away by such cooling is not available for use in chemical conversions.

By various aspects of my invention, one or more of the following, or other, objects can be attained. It is an object of this invention to provide a method for performing chemical reactions in a plasma discharge with high chemical and electrical efficiency. It is a further object of this invention to provide a plasma arc reactor which is resistant to deterioration at high temperatures. It is a further object of this invention to provide a plasma arc reactor which allows rapid and uniform mixing of the reactants with the plasma. It is still another object of this invention to provide a plasma arc reactor with means for controlling the temperature of the arc. It is another object of this invention to provide a plasma arc reaction chamber which requires no external cooling.

These and other objects may be accomplished by the reactor of my invention, which utilizes a rotating, transferred arc which cuts across a feed stream within an insulated, elongated tubular graphite anode which functions as the reaction chamber. Within this chamber the arc is rapidly rotated, and the reactant feed is injected at several points which can be tangential and/or radial. The operation and specific features of my invention will become more readily apparent by reference to the drawings.

Figure 1:
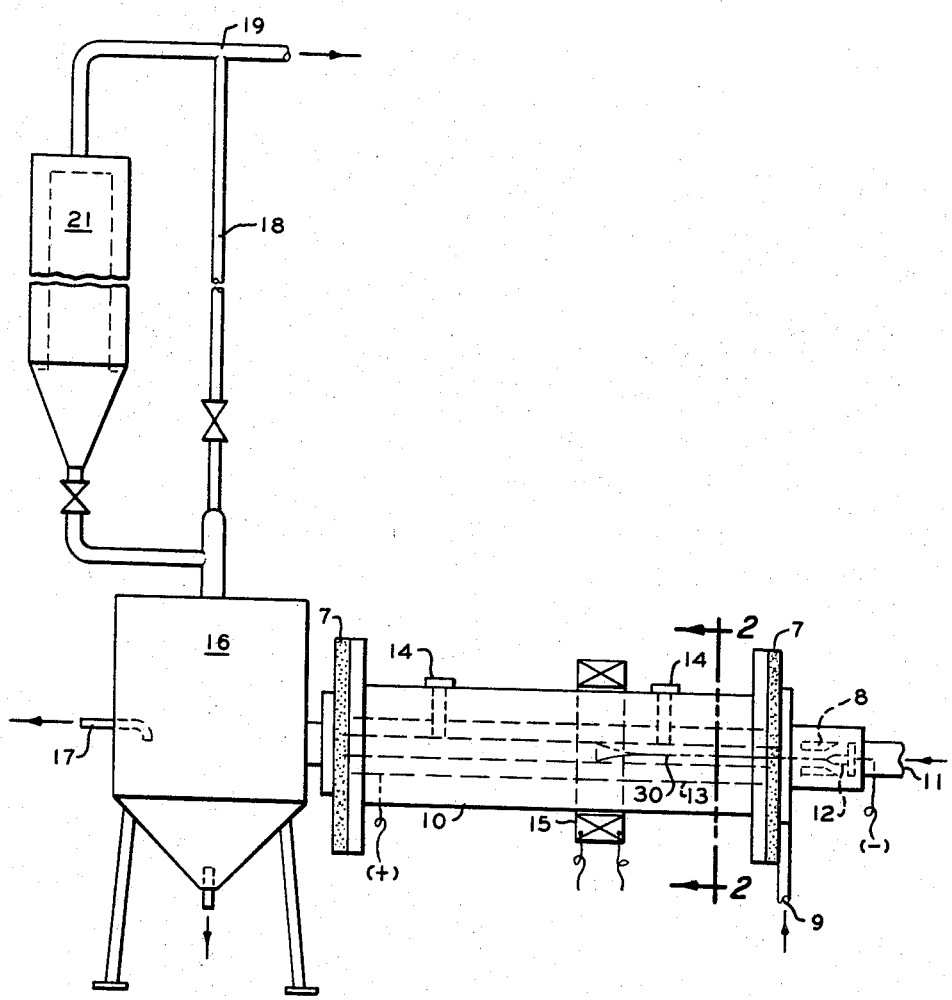
FIGURE 1 illustrates the use of my invention in the production and separation of carbon black.

The application of my invention to the formation of carbon black from hydrocarbons is shown in FIGURE 1. The reactor is shown generally at 10. Arc gas, which may be nitrogen, hydrogen, or argon is introduced through line 11 past cathode 12. An arc is drawn between cathode 12 and an interior portion anode 13. A temporary anode 8 is used in starting the arc. The hydrocarbon feed enters the reactor just downstream of the cathode through port 9. In operation, the arc 30 extends for a distance within elongated reactor-anode 13, being positioned and rotated by magnetic field produced by coil 15. Insulators 7 electrically isolate reactor-anode 13 from the cathode 12. The construction of the anode and method of introducing the hydrocarbon feed into the anode section will be further described in connection with a later drawing. One or more thermocouple wells are provided in the reactor as shown at 14. The hot gas stream exits from the reactor into water jacketed quench tank 16, provided with a gas sampling port 17. Carbon black from the quench tank is blown through lines 18 and 19 to a series of conventional bag filters (not shown). When it is desired to sample the output of the reactor, the gas stream is diverted temporarily by sampling bag filter 21.

Figure 3:
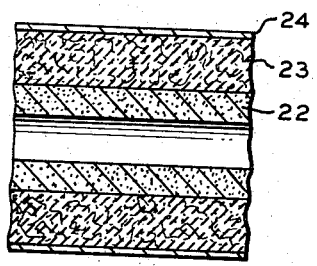
FIGURE 3 is a cross sectional view of the reactor chamber taken along line 3—3 of FIGURE 2.
Figure 2:
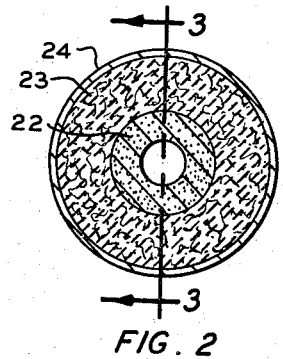
FIGURE 2 is a section of the reactor chamber of my invention taken along line 2—2 of FIGURE 1.

FIGURES 2 and 3 show the construction of the reactor chamber walls in one modification of my invention. In these drawings the interior graphite liner is designated 22, a zirconia refractory 23 surrounds the graphite, and is in turn incased in a metal shield 24.

Figure 5:
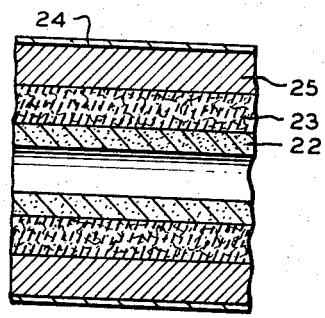
FIGURE 5 is a cross sectional view of the reactor chamber shown in FIGURE 4.
Figure 4:
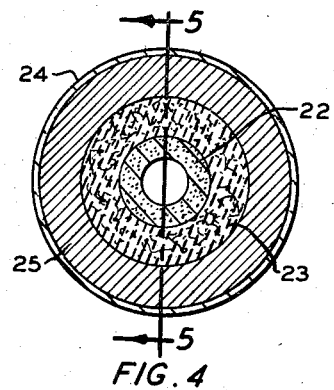
FIGURE 4 is a modification of the reactor chamber of my invention.

FIGURES 4 and 5 illustrate another reactor chamber wall construction for high temperature applications. In addition to graphite liner 22 and zirconia insulation 23, an additional layer of aluminum oxide insulation 25 is provided. These layers are incased in metal shell 24.

Figure 6:
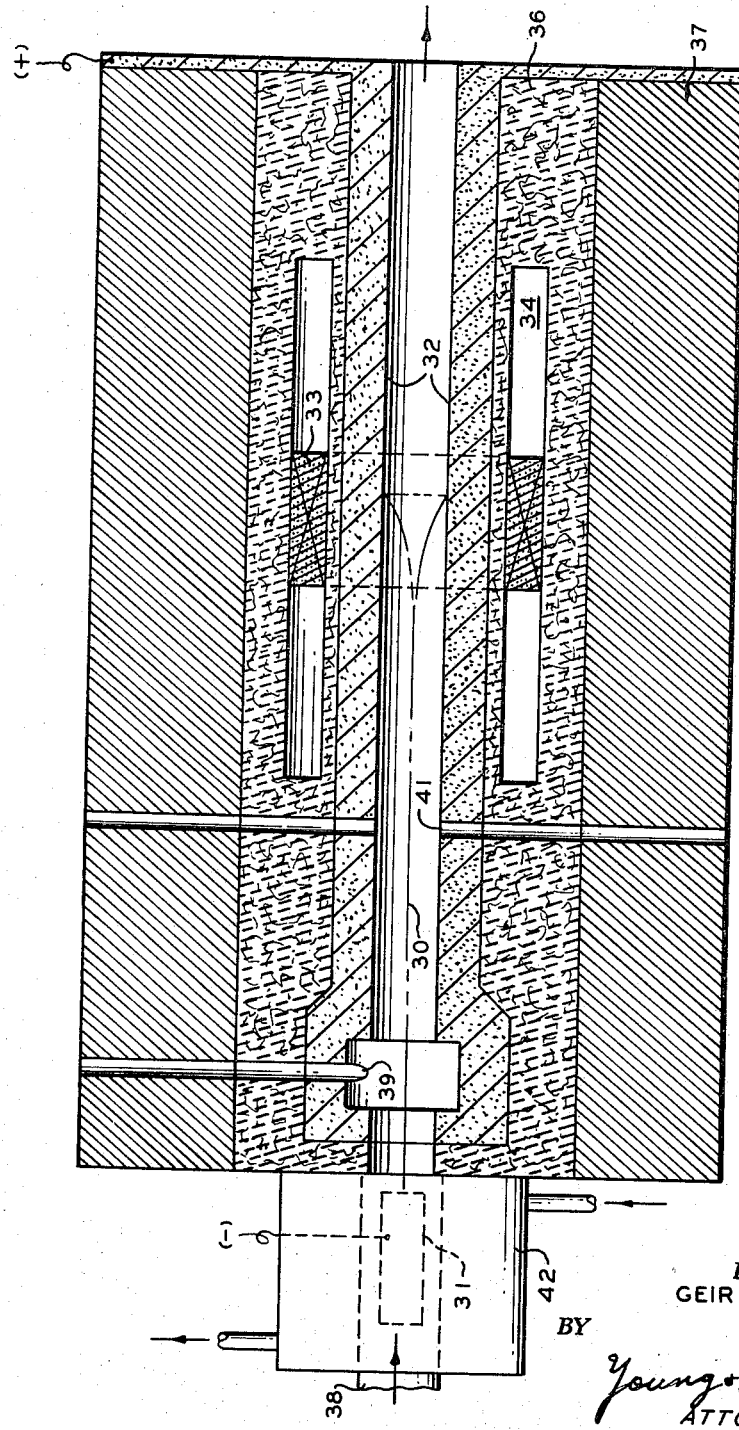
FIGURE 6 is a detailed view of the reactor of my invention.

Details of the reactor chamber are shown in FIGURE 6. An electric arc designated as 30 is drawn between cathode 31 and tubular graphite anode 32. The arc is attracted to the downstream portion of the anode by the magnetic coil 33 bedded in the reactor insulation. The position where arc 30 strikes anode 32 may be adjusted by moving coil 33 longitudinally within slot 34. Coil 33 also serves to rotate the arc rapidly within the reaction chamber, thereby causing the arc to cut across the gas stream.

Graphite anode 32 is surrounded by a layer of zirconia 36. The zirconia is in turn surrounded by a layer of alumina 37. It is desirable that the zirconia layer be approximately twice as thick as the graphite layer, and that the alumina layer be about three times as thick as the graphite layer.

The arc gas is introduced around the cathode through inlet 38. The hydrocarbon reactant gases are introduced through tangential port 39 and one or more radial ports 41. Cathode 31 is cooled by water jacket 42. Coil 33 is also cooled by a water jacket (not shown) which is movable with the coil. The coil is moved within slot 34 by appropriate movement of positioning devices (not shown) such as a rod extending through the insulation of the reactor and fastened to the coil.

The term "transferred arc" is generally used in plasma jet operations such as in welding wherein the arc is extended from an electrode in the plasma generator to the work piece being welded. Thus, the object being welded acts both as the anode and the recipient of the energy generated. Such a transferred arc distinguishes from a spraying operation wherein both electrodes are contained in the plasma gun and the hot tail flame containing the material being sprayed contacts the work piece, which is not electrically connected with the plasma gun. In the context of this invention, the term "transferred arc" is used in a somewhat analogous sense to show that the arc is drawn from one electrode to another which is relatively remote. The remote electrode serves as the anode in this invention, and also is so constructed as to act as a chemical reactor.

The arc gas may be used for either vortex or sheath stabilization of the arc. Sheath stabilization, whereby a high velocity stream of gas passes annularly past the cathode and generator nozzle, is the preferred method, and is that which is shown in the drawings. The sheath gas shields the electrode zone from excessive heat and also provides at least some of the ionic species for the arc path. Suitable gases are hydrogen, nitrogen, argon and the like. The sheath gas can also contain substantial quantities of hydrocarbon reactant. In some cases a hydrocarbon reactant itself can be used as the sheath gas and entry of the hydrocarbon in this fashion can supplement or replace entry of hydrocarbon feed through other ports in the anode.

The cathode is constructed from conventional materials. Graphite is the preferred material although other materials such as thoriated tungsten can also be used. In this case the cathode is designed to minimize the neutralization of the tungsten surface (forming tungsten carbide) by contact with the positive carbon ions, some of which might travel far enough upstream in the gas flow to make such contact. In operation, the cathode is largely self cooling by virtue of its thermionic emission. However, some additional cooling of the cathode zone is generally required, and this can be accomplished by means of a flowing water jacket.

The hydrocarbon reactant feed gas is introduced into the anode at a point such that essentially the entire length of the anode is subjected to the sweeping and cooling action of the hydrocarbon. Thus, the hydrocarbon feed stream is utilized not only as a chemical reactant, but also as a coolant for the anode surface. The multiple injection of hydrocarbon feed, tangential or radial or combinations of these, along the graphite anode provides for improved mixing of hot and cold species.

The arc is drawn to the center portion of the anode not only with the aid of the high velocity sheath gas stream, but also by means of a magnetic field produced by a solenoid coil. This coil is placed about midway in the anode, and is close to the anode as is practical. The field strength of the magnetic field at the inner wall of the anode should be sufficient to attract the arc within that field, and will generally be in the range of 50–500 gauss. The magnetic field also causes the arc to rotate extremely rapidly, thus cutting across the flowing gas and efficiently bringing the gas to a high thermal level.

It is preferred that provision be made to allow moving the arc landing area longitudinally within the cylindrical anode. This can be accomplished by providing for longitudinal movement of the coil along the anode or by the presence of multiple solenoid coils which can be used alternatively. Because of its proximity to the reaction zone and to the hot anode, the solenoid coil must also be provided with cooling such as a flow of cooling water.

When desired, turbulence and additional mixing of the gas can be adjusted with the addition of chokes and baffles within the reaction zone.

Lengthening the arc will result in greater contact of the arc with the feed stream and longer residence time in the zone of highest temperature. The residence time in the reactor will vary depending upon the feed materials and the products desired. In the preparation of carbon black, benzene requires less time than propane which in turn requires less time than methane. Generally, however, the residence time in the hot zone will be about 0.05–1 millisecond.

The anode, for the highest durability, must consist essentially of graphite. Graphite has a useful operating temperature of about 6000 to 7000° F., and a high thermal conductivity which allows the entire length of the anode to be heated uniformly. During extended use at very high temperatures, the graphite will tend to sublime slowly, but will not disintegrate. The sublimation will cause some erosion of the anode, but this will be slow and will not tend to plug the reactor. Additionally, graphite is particularly resistant to the reducing conditions found in the reactor.

The anode is generally in the form of a hollow cylinder backed with zirconia insulation. The zirconia layer is normally made twice as thick as the anode wall. It serves both as thermal insulation and as a barrier to protect the graphite from high temperature oxidation of air. The zirconia itself is resistant to temperatures up to about 4800° F. For operation in the higher temperature ranges, another layer of insulation is desirable. Alumina, resistant to temperatures up to about 3000° F., is most suitable for this application as it has a lower heat conductivity than zirconia, and is more resistant to oxidation. Any conventional zirconia and alumina, in any conventional form, can be used. In a preferred embodiment, a finely divided alumina or zirconia is formed into a paste and cast into the shape of the reactor. The entire structure is generally incased in a metal shield protected from mechanical shocks and blows.

Many chemical reactions have been demonstrated feasible by use of this apparatus and method. An application of particular importance is the production of carbon black from the lower hydrocarbons. The actual structure of the carbon black formed will depend upon the particular hydrocarbon feed used, the plasma, the temperature of the arc, and the nature of the quench. The apparatus shown in FIGURE 1, for example, has been used for forming a high structure, high surface area black upon the pyrolysis of methane in a nitrogen plasma at temperatures above 4900° F. Because of its fine particle size, this black finds application as a catalyst or a catalyst support carbon.

At lower temperatures, it is possible to obtain rubber reinforcing carbon blacks from either propane or methane operating at temperatures of 2500–3000° F.

In performing most chemical reactions, it is desirable that the hot gases be quenched as rapidly as possible after leaving the arc zone to prevent side and back reactions. Thus, the apparatus is normally provided with a conventional quenching device such as a water jacketed qunch tank immediately following the arc chamber. In the case of production of solid materials, bag filters are generally employed to separate the solid product from the gas stream.

In addition to the pyrolysis of hydrocarbons to form carbon black, the reactor of this invention can be used to carry out a variety of other hydrocarbon conversions. For example, acetylene can be formed in the reactor from methane, ethane, or propane. The reaction of hydrocarbons with nitrogen containing materials or with a nitrogen sheath gas can yield hydrogen cyanide or mixtures of hydrogen cyanide and acetylene which are useful in the preparation of acrylonitrile. For each reaction, the rate of gas flow through the arc, type of plasma gas, and temperature for optimum results must be determined experimentally.

To begin operation of the invention apparatus, the arc is struck between the cathode and the anode by any conventional means. For example, an arc can be initially struck between the cathode and a temporary anode immediately adjacent to it. This can be done with the aid of a radio high frequency discharge to provide the initial ionization for a starting current path. After the arc is in operation, it can be transferred from the temporary proximate anode, to a point on the anode-reactor with the aid of a movable anode in the form of a graphite rod. The rod is moved within the graphite tube (the anode-reactor) to a point near the cathode and the arc is transferred to it by increasing the electrical resistance to the temporary proximate anode to deenergize it. The rod is then moved away from the cathode within the hollow graphite tube and this movement extends the arc to the length desired and to a point where it is in control of the solenoid coil. At this point, the movable rod anode is deenergized and removed while simultaneously energizing the anode-reactor which then becomes the sole electrode downstream of the cathode. The above technique for extending and transferring the arc can also be supplemented by movement of the electro-magnetic field by the appropriate energizing or movement of the solenoid coil during that operation.

The invention can be further illustrated by the following example.

*Example*

A stream containing acetylene and hydrogen cyanide is produced by the conversion of methane and ammonia in apparatus such as that described in FIGURE 6. Such a stream is valuable in that it can be passed over a catalyst under suitable conditions to make acrylonitrile, a commercially important monomer.

The arc is struck between the carbon cathode and the carbon anode which is also the tubular reaction zone. The arc gas, nitrogen, is passed into the axis of the apparatus at a rate of 5.31 lb./hr. to provide a sheath-stabilized plasma arc. A mixture of methane and ammonia, preheated to about 1500° F., is passed into the reactor through four equispaced radial entry ports at a rate of 1.52 and 1.62 lb./hr., respectively. Simultaneously, another stream of membrane, also preheated to about 1500° F., is passed into the tangential port at the rate of 3.04 lb./hr.

The mixture of feed gases is contacted with the plasma stream within the reactor for a residence time of about 0.3 millisecond and at a temperature of about 3100° F. The feed gases are mixed by the arc which rotates at about 10,000 revolutions per second under the influence of the magnetic field having a strength of about 100 gauss. Leaving the reaction zone, the effluent gases are quenched to about 950° F. before being led to the acrylonitrile formation stage. The effluent stream contains the following components at the indicated flow rates in lb./hr.

| | |
|---|---|
| Hydrogen | 1.09 |
| Methane | 0.40 |
| Ammonia | 0.12 |
| Acetylene | 1.73 |
| Hydrogen cyanide | 2.33 |
| Nitrogen | 5.33 |
| Carbon (solid) | 0.49 |

In the run, the total methane conversion is 91.2 percent and the total ammonia conversion is 92.5 percent. The high electrical efficiency is reflected in the power consumption of only 4.35 kw./lb. hydrogen cyanide and lb. of acetylene. Water cooling is utilized only for the cathode and coil.

Reasonable variation and modification are possible within the scope of my invention, the essence of which is that chemical reactions are conducted in a rotating transferred arc plasma jet in which the graphite anode forms the reaction chamber, and in which no external cooling is required because of the novel construction of the reactor and the use of sheath gas.

I claim:

1. A plasma arc reactor comprising in combination a cathode, a reaction chamber comprised of an elongated graphite anode insulated by refractory metal oxide of substantial thickness, electromagnetic means for rotating an arc within the reaction chamber, and means for feeding reactant gases tangentially and radially into said reaction chamber.

2. A plasma arc reactor comprising in combination a cathode, a reaction chamber comprised of an elongated tubular graphite anode insulated by refractory metal oxide of substantial thickness, electromagnetic means for maintaining and rotating an elongated arc between said cathode and an interior portion of said anode, and means for feeding reactant gases tangentially and radially into said reaction chamber.

3. The apparatus of claim 2 wherein the reaction chamber is comprised of a graphite tube insulated on the outside with zirconia.

4. The apparatus of claim 2 wherein the reaction chamber is comprised of a graphite tube insulated on the outside by zirconia, which is further insulated by alumina.

5. The apparatus of claim 4 wherein the ratio of the wall thicknesses of graphite to zirconia to alumina is approximately 1:2:3.

6. A plasma arc reactor comprising in combination an arc gas inlet, a cathode in the arc gas stream, a reaction chamber comprised of an elongated tubular graphite anode placed downstream from said cathode, said graphite being surrounded by a layer of zirconia and said zirconia being surrounded by a layer of alumina, a magnetic coil outside of said reaction chamber adapted to attract and rotate an electric arc drawn between said cathode and the interior of said anode, means for introducing reactant gas streams tangentially and radially into said reaction chamber.

7. A plasma arc reactor for performing chemical reactions in a plasma discharge comprising introducing reacting reactant gases tangentially and radially into a transferred arc reactor comprising in combination an arc gas inlet, a cathode in the arc gas stream, a reaction chamber comprised of an elongated tubular graphite anode placed downstream of said cathode, said graphite being surrounded by a layer of zirconia and said zirconia being surrounded by a layer of alumina, a magnetic coil outside of said reaction chamber adapted to attract and rotate an electric arc drawn between said cathode and the interior of said anode, means for removing products from the reactor to a quenched zone and subsequently to a product separator.

8. A plasma arc reactor comprising in combination a cathode, a reaction chamber comprised of an elongated graphite anode insulated by refractory metal oxide of substantial thickness, electromagnetic means for rotating an arc within the reaction chamber, and means for feeding reactant gases into said reaction chamber.

9. A plasma arc reactor comprising in combination a cathode, a reaction chamber comprised of an elongated tubular graphite anode insulated by refractory metal oxide of substantial thickness, electromagnetic means for maintaining and rotating an elongated arc between said cathode and an interior portion of said anode, and means for feeding reactant gases into said reaction chamber.

10. A plasma arc reactor comprising in combination an arc gas inlet, a cathode in the arc gas stream, a reaction chamber comprised of an elongated tubular graphite anode placed downstream from said cathode, said graphite being surrounded by a layer of zirconia, a magnetic coil outside of said reaction chamber adapted to attract and rotate an electric arc drawn between said cathode and the interior of said anode, means for introducing reactant gas streams into said reaction chamber.

11. A plasma arc reactor comprising in combination an arc gas inlet, a cathode in the arc gas stream, a reaction chamber comprised of an elongated tubular graphite anode placed downstream from said cathode, said graphite being surround by a layer of zirconia and said zirconia being surrounded by a layer of alumina, a magnetic coil outside of said reaction chamber adapted to attract and rotate an electric arc drawn between said cathode and the interior of said anode, means for introducing reactant gas streams into said reaction chamber.

References Cited

UNITED STATES PATENTS

| | | | |
|---|---|---|---|
| 1,201,607 | 10/1916 | Moscicki | 204—311 |
| 3,073,769 | 1/1963 | Doukas | 204—171 |
| 3,168,592 | 2/1965 | Cichelli et al. | 204—171 |
| 3,179,733 | 4/1965 | Schotte | 204—171 |
| 3,217,056 | 11/1965 | Sennewald et al. | 204—171 |
| 3,223,605 | 12/1965 | Ruble et al. | 204—173 |
| 3,318,791 | 5/1967 | Harris et al. | 204—171 |

HOWARD S. WILLIAMS, *Primary Examiner.*

ROBERT K. MIHALEK, *Examiner.*